United States Patent [19]

Marason et al.

[11] Patent Number: 5,179,562
[45] Date of Patent: Jan. 12, 1993

[54] FREQUENCY DOUBLED ULTRAVIOLET LASER

[75] Inventors: Eric G. Marason, San Francisco; Jude Katsch, Felton; Alfred O. Feitisch, Cupertino; Steve Guggenheimer, Sunnyvale, all of Calif.

[73] Assignee: Spectra-Physics Lasers, Mountain View, Calif.

[21] Appl. No.: 810,954

[22] Filed: Dec. 19, 1991

[51] Int. Cl.[5] .............................................. H01S 3/10
[52] U.S. Cl. ....................................... 372/22; 372/34; 372/105; 372/21; 359/328
[58] Field of Search ........................ 372/21, 22, 105; 359/325–328; 385/122

[56] References Cited

U.S. PATENT DOCUMENTS

| | | | |
|---|---|---|---|
| 3,648,193 | 3/1972 | Foster | 331/94.5 |
| 3,849,667 | 11/1974 | Uematsu et al. | 372/22 |
| 3,858,056 | 12/1974 | Melamed et al. | 359/328 |
| 3,965,375 | 6/1976 | Bergman, Jr. | 359/330 |
| 4,019,159 | 4/1977 | Hon et al. | 372/34 |
| 4,181,899 | 1/1980 | Liu | 372/22 |
| 4,413,342 | 11/1983 | Cohen et al. | 372/22 |
| 4,637,026 | 1/1987 | Liu | 372/22 |
| 4,748,631 | 5/1988 | Bijorklund | 372/22 |
| 4,879,722 | 11/1989 | Dixon et al. | 372/22 |
| 4,907,238 | 3/1990 | Chun | 372/32 |
| 4,910,740 | 5/1990 | Oka | 372/22 |

Primary Examiner—Léon Scott, Jr.

[57] ABSTRACT

A frequency doubled ultraviolet laser comprising means for enabling a beam of coherent electromagnetic radiation to be propagated along an intracavity path, means for holding and translating an anisotropic crystal in this path, means for detecting the crystal temperature relative to the optimum frequency doubling temperature, and means for correcting any shortfalls in the efficiency of ultraviolet generation by adjusting the crystal temperature, crystal position, and/or the intensity of the fundamental beam.

11 Claims, 2 Drawing Sheets

FREQUENCY DOUBLED ULTRAVIOLET LASER

BACKGROUND—FIELD OF INVENTION

This invention relates to coherent light generating systems, especially to lasers for the generation of ultraviolet radiation by temperature-tuned phase-matched frequency doubling.

An object of the invention is to provide a coherent beam of ultraviolet radiation with long term stability.

BACKGROUND—DESCRIPTION OF PRIOR ART

The physical phenomenon known as second harmonic generation (SHG) provides a means for doubling the frequency of a laser source. Since the efficiency of conversion of the electromagnetic energy from the fundamental frequency to electromagnetic energy of the doubled frequency increases with intensity, techniques to improve this process have concentrated on maximizing the intensity of the fundamental beam. These techniques include focussing the beam within the anisotropic refractive index medium, Q-switching the laser, modelocking the laser, and accessing the higher intensity intracavity laser beam.

For temperature tuned phase matched second harmonic generation, several obstacles to stable, efficient, long term generation of continuous-wave ultraviolet radiation are found. Inhomogeneities present in any birefringent crystal can result in widely varying SHG efficiencies in different parts of the same crystal, a problem that is exacerbated when an intracavity beam is used. Nonuniformity in temperature throughout the crystal volume caused by varying distance from the thermal source or sink, contaminants, varying quality of surface polish, and inhomogeneities in the crystal bulk result in varying degrees of SHG efficiency. Finally, allowing the fundamental beam to pass through a single spot in the crystal for long periods of time results in a temporary degradation of SHG efficiency possibly due to the formation of ultraviolet absorbing color centers or to changes in the character of the polished entrance/exit faces of the crystal.

OBJECTIVES AND SUMMARY OF THE INVENTION

A principal object of this invention is to overcome the disadvantages cited above which adversely affect the efficiency and stability of temperature phase matched intracavity SHG of ultraviolet radiation. This is accomplished by providing a system with means for (1) translating the crystal through the intracavity beam during operation so that a fresh crystal volume is continually presented to the beam before temporary crystal degradation can occur; (2) comparing the ultraviolet output power to a preset value and adjusting the intracavity beam intensity to maintain that preset power value; and (3) monitoring the crystal temperature relative to the temperature for maximum SHG efficiency and adjusting the crystal temperature to that optimum value.

According to the invention, the frequency doubled ultraviolet laser includes means for enabling a beam of coherent electromagnetic radiation to be propagated along an intracavity path, means for holding and translating an anisotropic crystal in this path, means for detecting the crystal temperature relative to the optimum frequency doubling temperature, and means for correcting any shortfalls in the efficiency of ultraviolet generation by adjusting the crystal temperature, crystal position, and/or the intensity of the intracavity fundamental beam.

DRAWING REFERENCE NUMBERS

1—flat mirror
2—prism
3—laser active medium
4—intracavity fundamental beam
6—Brewster window
8—concave mirror
10—flat dichroic mirror
12—crystal
14—concave mirror
15—polished face of 12
16—polished face of 12
17—combined fundamental and second harmonic beam
20—flat ultraviolet mirror
22—ultraviolet ouput beam
24—beamsplitter
26—ultraviolet passing filter
28—photodetector
30—thermal plate
31—temperature sensor
32—thermoelectric cooler
33—source of alternating voltage
34—electrodes
40—direction normal to fundamental polarization plane
42—direction normal to 40 and parallel to 15 and 16
54—optimum crystal temperature point
56—crystal temperature too warm point
58—ultraviolet output power, no voltage, too warm
60—ultraviolet output power, with voltage, too warm
62—crystal temperature too cool point
64—ultraviolet output power, no voltage, too cool
66—ultraviolet output power, with voltage, too cool

DETAILED DESCRIPTION OF THE INVENTION

Figure 1:
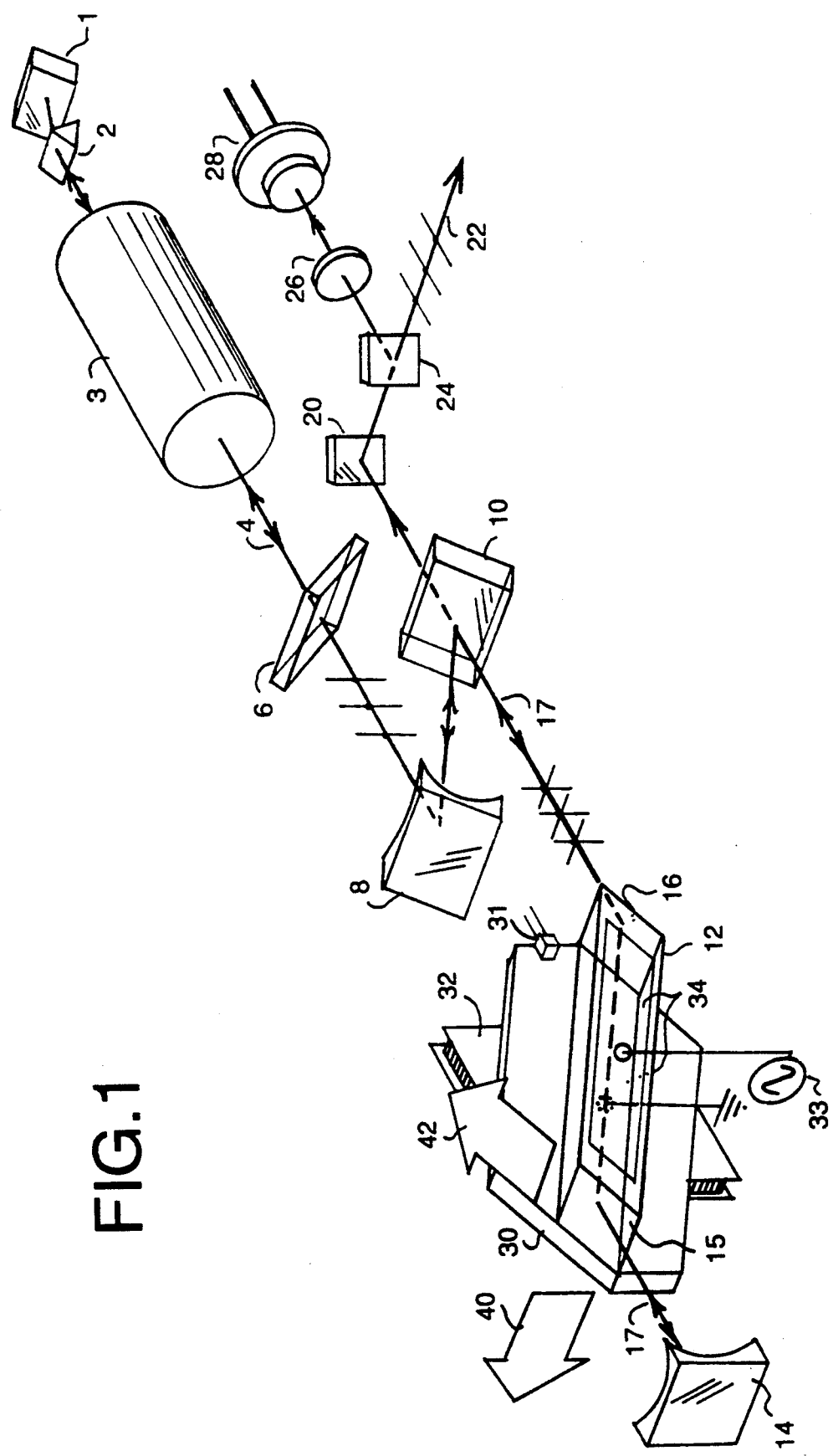
FIG. 1 shows a perspective elevational view of a laser according to the invention.

Referring now to FIG. 1, a laser active medium 3 is provided for emitting an intracavity fundamental beam 4 having a desired fundamental wavelength. In this particular embodiment of the invention, an argon ion laser is utilized for emitting a beam of wavelength 514.5 nanometers. Wavelength selection is effected by flat mirror 1, which is highly reflective at the fundamental wavelength, and prism 2.

Intracavity beam 4 passes through Brewster window 6, to concave mirror 8, to flat dichroic mirror 10, through crystal 12, to concave mirror 14. In this particular embodiment, crystal 12 is composed of potassium dihydrogen phosphate (KDP) and mirror curvatures and spacings are chosen to provide a beam waist within crystal 12 at the desired laser spatial mode. Crystal 12 is provided with parallel polished faces 15 and 16 which intercept the p-polarized intracavity fundamental beam 4 at Brewster's angle to minimize reflective loss. Brewster window 6 serves to insure the polarization of the fundamental wavelength and to provide an airtight seal against contaminants and condensation on the surfaces of crystal 12.

As the fundamental beam 4 enters the crystal at face 15, a portion of the 514.5 nanometer light is converted to ultraviolet radiation of wavelength 257.25 nanometers. The combined fundamental and second harmonic beam 17 exits at face 16 and is reflected back upon itself by concave mirror 14, which is highly reflective at both the fundamental and second harmonic wavelengths. Beam 17 passes through crystal 12 again in the opposite direction, generating additional ultraviolet radiation. Upon reaching flat dichroic mirror 10, the s-polarized ultraviolet component of beam 17 passes through to flat ultraviolet reflecting mirror 20, while the remaining fundamental intracavity beam 4 completes the round trip of the laser cavity.

Ultraviolet beam 22 passes through beamsplitter 24 as the laser output beam. A small fraction of beam 22 is reflected by beamsplitter 24 through ultraviolet passing filter 26 to photodetector 28.

Crystal 12 is in thermal contact with thermal plate 30 which cools crystal 12 via thermoelectric cooler 32 to the temperature at which frequency doubling of the fundamental beam 4 occurs, approximately minus 14 degrees Celsius for KDP at 514.5 nanometers. Inverting thermoelectric cooler 32 allows it to be used in heating mode. Temperature sensor 33 is in thermal contact with cold plate 30 and provides an electronic signal of the approximate absolute crystal temperature.

Crystal 12 is provided with electrodes 34 in the form of gold plating on two opposite faces. One of electrodes 34 is in electrical contact with a source of alternating voltage 33 which serves to dither the refractive index of crystal 12; the other electrode is kept at ground potential. The frequency of voltage modulation is approximately 10 kilohertz. This dither appears as a small modulation of the ultraviolet output beam 22 as detected by photodetector 28 and enables the locking onto the optimum temperature for maximum ultraviolet generation efficiency as described below.

Crystal 12, together with cold plate 30, temperature sensor 31, and thermoelectric cooler 32 is movable in two directions: direction 40 normal to the polarization plane of the fundamental beam 4; and direction 42 perpendicular to direction 40 and parallel to polished faces 15 and 16. Crystal motion in these directions allows beam 4 to pass through any portion of crystal 12 while preserving the distance of the beam waist to polished faces 15 and 16.

Figure 2:
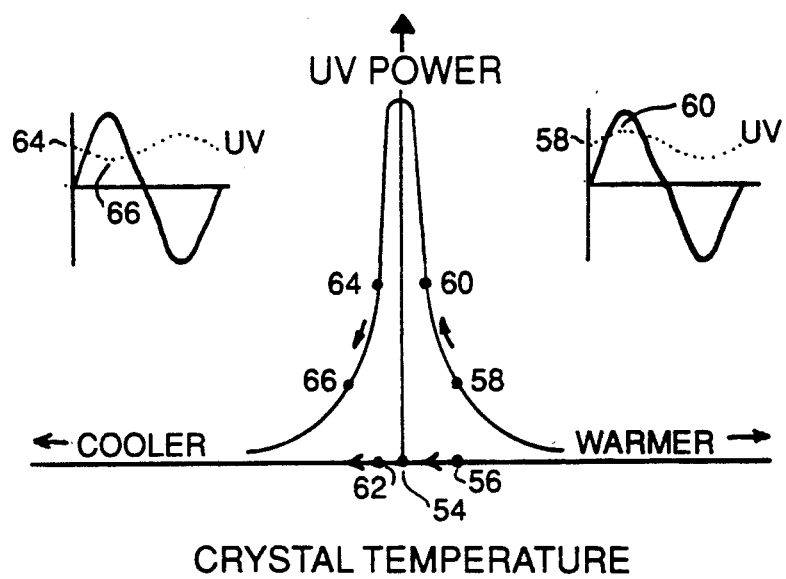
FIG. 2 shows a graphical representation of the crystal temperature feedback and optimization technique used in such laser.

FIG. 2 is a graphical representation of the technique used in the invention to attain and lock onto the optimum temperature for most efficient ultraviolet generation. The vertical axis of the graph represents ultraviolet power as measured in the output beam 22. The horizontal axis represents crystal temperature, with the temperature at the origin 54 being the optimum temperature for maximum ultraviolet power. Points on the horizontal axis to the right of the origin are warmer than the optimum temperature; points to the left are cooler than the optimum temperature. Voltage oscillations applied to the electrodes 34 on the crystal 12 have the effect of compressing the crystal in an oscillating fashion, thereby dithering the refractive index. For a too warm crystal, shown by point 56, the detected change in ultraviolet output power is shown by the change from points 58 to 60—an increase. For a too cool crystal, shown by point 62, the detected change in ultraviolet output power is shown by the change from points 64 to 66—a decrease. By electronically comparing the phases of the applied voltage and the resultant modulation in ultraviolet output power as measured by photodetector 28, the temperature of the crystal 12 relative to the optimum temperature 54 can be determined and corrected for. Because of the varying slope of the power/temperature curve shown in FIG. 2, the amplitude of the ultraviolet modulation signal decreases as the peak of the curve is approached. This factor is used to decrease the rate at which the temperature of crystal 12 is changed, reducing overshoot and facilitating the maintenance of the optimum temperature.

In operation, the crystal 12 is continually moved through the intracavity fundamental beam 4 in small steps. As each new crystal volume is presented to intracavity fundamental beam 4, the intensity of the ultraviolet output beam 22 as measured by photodetector 28 is compared to the desired preset ultraviolet intensity level. If the ultraviolet intensity is too low, the intensity of the intracavity fundamental beam 4 is increased electronically until the required ultraviolet intensity is achieved. In the case of the argon ion laser, this entails raising the plasma tube current. If the ultraviolet intensity is too high, the intensity of the intracavity fundamental beam 4 is decreased electronically until the required ultraviolet intensity is achieved. In the case of the argon ion laser, this entails lowering the plasma tube current.

Crystal temperature is also continually adjusted during operation of the invention. If the oscillating voltage applied to the crystal electrodes 34 and the resultant modulation in ultraviolet output power as measured by photodetector 28 are found to be in phase, then the crystal is too warm and current is supplied to the thermoelectric cooler 32 to further cool the crystal. If the oscillating voltage and resultant modulation are out of phase, then the crystal 12 is too cool and is allowed to rise in temperature by the absorption of ambient heat.

Because of the generally low thermal conductivity of anisotropic crystals, the time constant for crystal temperature adjustment is generally too large to rely on temperature adjustment as the sole means of maintaining a constant level of ultraviolet output power. Conversely, adjustment of the intracavity fundamental beam intensity as the sole means of ultraviolet stabilization is untenable because raising the beam intensity tends to warm an already too-warm crystal volume, moving the crystal temperature even further away from the optimum. Without knowledge of the relative temperature and active temperature adjustability, the required fundamental beam intensity tends to increase without limit.

Figure 3:
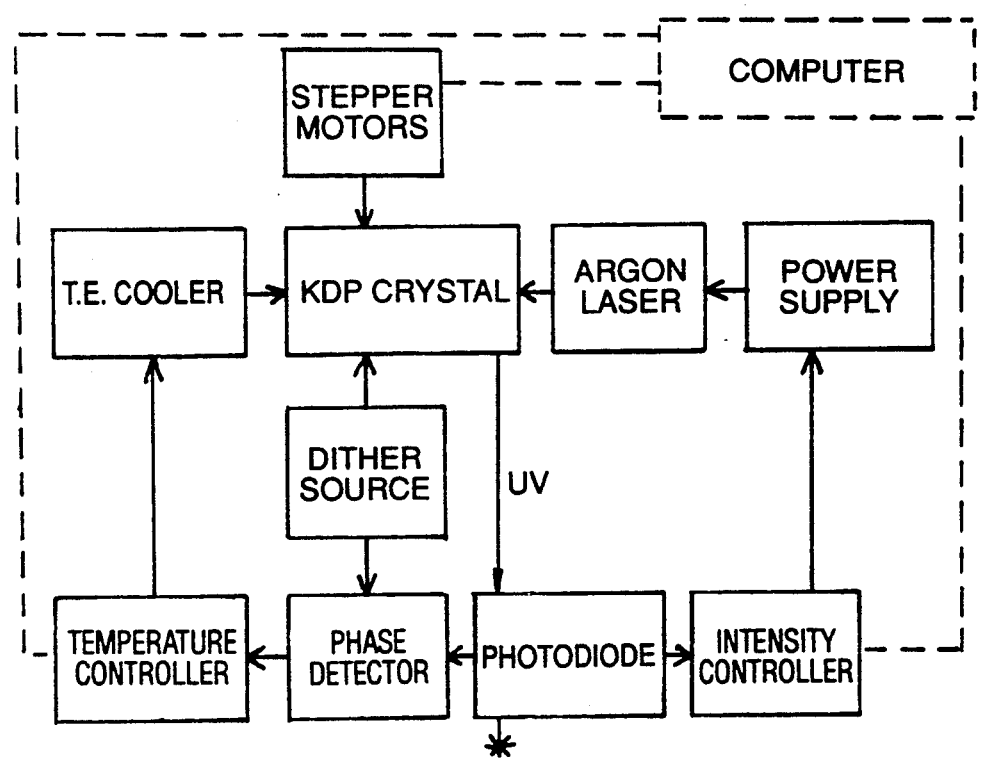
FIG. 3 shows a schematic of the interconnections between the electronic and optical elements of such laser.

FIG. 3 is a schematic diagram of the interconnections between the electronic and optical elements of the invention. The dashed computer box indicates the connections for optional computer control.

The invention need not be restricted to the choice and arrangement of every element above. For crystals other than KDP or fundamental wavelengths other than 514.5 nanometers, a temperature higher than ambient may be required to phase match. In these cases, the thermoelectric cooler can be used in heating mode by inverting it on the cold plate. Crystal motion need not be in two directions; scanning along a line in a single direction is also feasible. An argon ion laser need not be used; any laser with electronically adjustable gain will also serve. A modelocked fundamental beam can be used increase the ultraviolet conversion efficienty. Finally, small, pure crystals may allow the invention to operate with a thermal response time so rapid that fundamental beam gain adjustment is unnecessary.

We claim:

1. A laser for generation of ultraviolet radiation by temperature-tuned phase-matched frequency multiplication, comprising means for enabling a fundamental beam of electromagnetic radiation to be propagated along a path, means for holding and translating through one or more degrees of freedom a birefringent crystal in said path, electronic means for detecting a temperature of said crystal relative to a temperature for maximum efficiency of ultraviolet generation, said electronic means comprising two or more electrodes situated close enough to said crystal to provide a detectable modulation of the generated ultraviolet output beam when said electrodes are electrically connected to a source of alternating voltage of sufficient amplitude and frequency, said detectable modulation being in phase with said alternating voltage when the temperature of said crystal is too high and out of phase with said alternating voltage when the temperature of said crystal is too low, means for increasing, decreasing, and maintaining the temperature of said crystal, an output mirror reflecting said fundamental beam and transmitting said generated ultraviolet beam, optoelectronic means for monitoring the intensity of said generated ultraviolet beam, whereby constant, stable output of said ultraviolet radiation is maintained.

2. The laser of claim 1 further comprising means for adjusting the intensity of said fundamental beam whereby the intensity of said ultraviolet beam is maintained at a preset level.

3. The laser of claim 2 wherein said means for adjusting the intensity of said fundamental beam is controlled by a computer.

4. The laser of claim 1 wherein said crystal is made of potassium dihydrogen phosphate.

5. The laser of claim 1 wherein said crystal is made of potassium dideuterium phosphate.

6. The laser of claim 1 wherein said laser is an argon ion laser.

7. The laser of claim 1 wherein said laser is continuous wave.

8. The laser of claim 1 wherein said laser is modelocked.

9. The laser of claim 1 wherein a housing is provided around said crystal that provides thermal insulation and exhibits minimal outgassing in an ultraviolet environment.

10. The laser of claim 1 wherein a stream of dry gas is made to flow by said crystal to further minimize contamination of or damage to said crystal from deposition of outgassed substances and condensation of atmospheric water.

11. The laser of claim 1 wherein the translation and temperature of said crystal are controlled by a computer.

* * * * *